(12) United States Patent
Hutchison et al.

(10) Patent No.: US 10,906,114 B2
(45) Date of Patent: Feb. 2, 2021

(54) SYSTEM FOR ARC WELDING WITH ENHANCED METAL DEPOSITION

(71) Applicant: Illinois Tool Works Inc., Glenview, IL (US)

(72) Inventors: Richard Martin Hutchison, Iola, WI (US); Kevin Michael Scott, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 335 days.

(21) Appl. No.: 13/724,497

(22) Filed: Dec. 21, 2012

(65) Prior Publication Data

US 2014/0175072 A1    Jun. 26, 2014

(51) Int. Cl.
| | | |
|---|---|---|
| B23K 9/095 | (2006.01) | |
| B23K 9/10 | (2006.01) | |
| B23K 9/28 | (2006.01) | |

(52) U.S. Cl.
CPC ............ B23K 9/095 (2013.01); B23K 9/1093 (2013.01); B23K 9/28 (2013.01)

(58) Field of Classification Search
CPC .................................. B23K 9/08; B23K 9/176
USPC .............. 219/54–60 A, 70, 78.01, 101–116, 219/130.1–133, 137 PS
See application file for complete search history.

(56) References Cited

U.S. PATENT DOCUMENTS

| | | |
|---|---|---|
| 2,365,958 A | 12/1944 | Holslag |
| 2,416,047 A | 2/1947 | Dolan |
| 3,288,982 A | 11/1966 | Haruyoshi |
| 3,725,629 A | 4/1973 | Vickers |
| 3,809,853 A | 5/1974 | Manz |
| 3,849,871 A | 11/1974 | Kaunitz |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,426,565 A | 1/1984 | Rueter |
| 4,447,703 A * | 5/1984 | Stol ............................... 219/136 |
| 4,467,176 A | 8/1984 | Mizuno |
| 4,493,971 A | 1/1985 | Nawa |
| 4,531,040 A | 7/1985 | Nawa |

(Continued)

FOREIGN PATENT DOCUMENTS

| | | |
|---|---|---|
| CA | 2072711 | 12/1992 |
| CN | 2181354 | 11/1994 |

(Continued)

OTHER PUBLICATIONS

International Search Report from PCT Application No. PCT/US2014/055529, dated Mar. 6, 2015, 9 pgs.

(Continued)

*Primary Examiner* — Tu B Hoang
*Assistant Examiner* — Thomas J Ward
(74) *Attorney, Agent, or Firm* — McAndrews, Held & Malloy, Ltd.

(57) ABSTRACT

A welding system includes a power supply configured to output power to a welding device. The power supply is configured to alternate the power output between an arc phase and a hotwire phase. The power output in the arc phase produces an arc between a welding electrode and a workpiece, and the power output in the hotwire phase heats the welding electrode without producing an arc.

16 Claims, 5 Drawing Sheets

(56) References Cited

U.S. PATENT DOCUMENTS

| | | | |
|---|---|---|---|
| 4,536,634 A | 8/1985 | Nawa | |
| 4,546,234 A | 10/1985 | Ogasawara | |
| 4,570,048 A | 2/1986 | Poole | |
| 4,580,026 A | 4/1986 | Stol | |
| 4,628,182 A | 12/1986 | Hori et al. | |
| 4,631,385 A | 12/1986 | Rothermel | |
| 4,667,083 A | 5/1987 | Stol | |
| 4,728,761 A | 3/1988 | Mucha | |
| 4,897,523 A | 1/1990 | Parks | |
| 4,950,348 A | 8/1990 | Larsen | |
| 4,954,691 A | 9/1990 | Parks | |
| 4,973,821 A * | 11/1990 | Martin | B23K 9/1062 219/130.51 |
| 5,001,326 A | 3/1991 | Stava | |
| 5,043,557 A | 8/1991 | Tabata | |
| 5,086,207 A | 2/1992 | Deam | |
| 5,101,086 A | 3/1992 | Dion | |
| 5,118,028 A | 6/1992 | Ogawa | |
| 5,140,123 A | 8/1992 | Mitani | |
| 5,148,001 A | 9/1992 | Stava | |
| 5,208,433 A | 5/1993 | Hellegouarc | |
| 5,270,516 A | 12/1993 | Hamamoto | |
| 5,278,390 A | 1/1994 | Blankenship | |
| 5,315,089 A | 5/1994 | Hughes | |
| 5,319,179 A | 6/1994 | Joecks | |
| 5,343,023 A | 8/1994 | Geissler | |
| 5,349,156 A | 9/1994 | Madigan | |
| 5,352,871 A | 10/1994 | Ross | |
| 5,367,138 A | 11/1994 | Moss | |
| 5,412,184 A | 5/1995 | McGaffigan | |
| 5,461,215 A | 10/1995 | Haldeman | |
| 5,466,916 A | 11/1995 | Iguchi | |
| 5,504,309 A | 4/1996 | Geissler | |
| 5,526,561 A | 6/1996 | McGaffigan | |
| 5,710,413 A | 1/1998 | King | |
| 5,714,738 A | 2/1998 | Hauschulz | |
| 5,739,506 A | 4/1998 | Hanton | |
| 5,742,029 A | 4/1998 | Stava | |
| 5,756,967 A | 5/1998 | Quinn | |
| 5,773,799 A | 6/1998 | Maxfield | |
| 5,783,799 A | 7/1998 | Geissler | |
| 5,844,193 A | 12/1998 | Nomura | |
| 5,963,022 A | 10/1999 | Buda | |
| 5,968,587 A | 10/1999 | Frankel | |
| 6,002,104 A | 12/1999 | Hsu | |
| 6,008,470 A | 12/1999 | Zhang | |
| 6,043,471 A | 3/2000 | Wiseman | |
| 6,051,810 A | 4/2000 | Stava | |
| 6,090,067 A | 7/2000 | Carter | |
| 6,107,602 A | 8/2000 | Geissler | |
| 6,115,273 A | 9/2000 | Geissler | |
| 6,169,263 B1 | 1/2001 | Derby | |
| 6,204,476 B1 | 3/2001 | Reynolds | |
| 6,248,976 B1 | 6/2001 | Blankenship | |
| 6,265,688 B1 | 7/2001 | Lyshkow | |
| 6,278,074 B1 | 8/2001 | Morlock | |
| 6,292,715 B1 | 9/2001 | Rongo | |
| 6,331,694 B1 | 12/2001 | Blankenship | |
| 6,359,258 B1 | 3/2002 | Blankenship | |
| 6,479,792 B1 | 11/2002 | Beiermann | |
| 6,486,439 B1 | 11/2002 | Spear | |
| 6,515,259 B1 | 2/2003 | Hsu | |
| 6,583,386 B1 | 6/2003 | Ivkovich | |
| 6,596,970 B2 | 7/2003 | Blankenship | |
| 6,624,388 B1 | 9/2003 | Blankenship | |
| 6,642,482 B2 | 11/2003 | Rappl | |
| 6,670,579 B2 | 12/2003 | Davidson | |
| 6,707,001 B1 | 3/2004 | Ulrich | |
| 6,710,297 B1 | 3/2004 | Artelsmair | |
| 6,720,529 B2 | 4/2004 | Davidson | |
| 6,744,012 B2 | 6/2004 | Ueda | |
| 6,747,247 B2 | 6/2004 | Holverson | |
| 6,849,828 B2 | 2/2005 | Aigner | |
| 6,906,284 B2 | 6/2005 | Kim | |
| 6,909,067 B2 | 6/2005 | Davidson | |
| 6,933,466 B2 | 8/2005 | Hutchison | |
| 6,958,263 B2 | 10/2005 | Bhattacharyya | |
| 6,974,931 B2 | 12/2005 | Holverson | |
| 6,974,932 B2 | 12/2005 | Holverson | |
| 6,984,806 B2 * | 1/2006 | Huismann | B23K 9/0735 219/137.71 |
| 6,995,338 B2 | 2/2006 | Hutchison | |
| 7,002,103 B2 | 2/2006 | Holverson | |
| 7,129,443 B2 | 10/2006 | Davidson | |
| 7,145,101 B2 | 12/2006 | Tong | |
| 7,244,905 B2 | 7/2007 | Das | |
| 7,265,320 B2 | 9/2007 | Ou | |
| 7,304,269 B2 | 12/2007 | Fulmer | |
| 7,307,240 B2 | 12/2007 | Holverson | |
| 7,683,290 B2 | 3/2010 | Daniel | |
| 8,203,100 B2 | 6/2012 | Ueda | |
| 8,288,686 B2 * | 10/2012 | Kaufman | B23K 9/1087 219/130.1 |
| 8,487,215 B2 | 7/2013 | Holverson | |
| 8,952,291 B2 * | 2/2015 | Hillen | B23K 9/0953 219/130.01 |
| 9,403,231 B2 | 8/2016 | Hutchison | |
| 9,539,662 B2 | 1/2017 | Hutchison | |
| 2002/0008095 A1 | 1/2002 | Norrish | |
| 2002/0045970 A1 | 4/2002 | Krause | |
| 2002/0107825 A1 | 8/2002 | Manicke | |
| 2002/0117487 A1 | 8/2002 | Corby | |
| 2002/0117488 A1 | 8/2002 | Arndt et al. | |
| 2003/0058149 A1 | 3/2003 | Jayadeva | |
| 2003/0085254 A1 * | 5/2003 | Katooka | B23K 9/10 228/101 |
| 2004/0010342 A1 | 1/2004 | Thelen | |
| 2004/0069759 A1 | 4/2004 | Davidson | |
| 2004/0182828 A1 | 9/2004 | Schmidt | |
| 2004/0188404 A1 | 9/2004 | Hutchison | |
| 2004/0222204 A1 | 11/2004 | Hutchison | |
| 2004/0238511 A1 | 12/2004 | Matus | |
| 2005/0184039 A1 | 8/2005 | Stava | |
| 2005/0269306 A1 | 12/2005 | Fulmer | |
| 2006/0163229 A1 | 7/2006 | Hutchison | |
| 2007/0051711 A1 | 3/2007 | Kachline | |
| 2007/0084840 A1 | 4/2007 | Davidson | |
| 2007/0102407 A1 | 5/2007 | Uezono | |
| 2007/0170163 A1 | 7/2007 | Narayanan | |
| 2007/0235434 A1 | 10/2007 | Davidson | |
| 2007/0267394 A1 | 11/2007 | Beck | |
| 2008/0264916 A1 | 10/2008 | Nagano | |
| 2008/0264917 A1 | 10/2008 | White | |
| 2008/0264923 A1 | 10/2008 | White | |
| 2009/0026188 A1 | 1/2009 | Schorghuber | |
| 2009/0173726 A1 | 7/2009 | Davidson | |
| 2009/0313549 A1 | 12/2009 | Casner et al. | |
| 2010/0059493 A1 | 3/2010 | McAninch | |
| 2010/0096373 A1 | 4/2010 | Hillen | |
| 2010/0133250 A1 | 6/2010 | Sardy | |
| 2010/0176104 A1 | 7/2010 | Peters | |
| 2010/0308026 A1 | 12/2010 | Vogel | |
| 2010/0308027 A1 | 12/2010 | Vogel | |
| 2010/0314371 A1 | 12/2010 | Davidson | |
| 2011/0108527 A1 | 5/2011 | Peters | |
| 2011/0114612 A1 | 5/2011 | Holverson | |
| 2011/0163080 A1 | 7/2011 | Beck | |
| 2011/0204034 A1 | 8/2011 | Schartner | |
| 2011/0248007 A1 * | 10/2011 | Takeda | B23K 9/092 219/130.51 |
| 2011/0297658 A1 * | 12/2011 | Peters | B23K 9/02 219/162 |
| 2012/0024828 A1 | 2/2012 | Oowaki et al. | |
| 2012/0061362 A1 | 3/2012 | Davidson | |
| 2012/0074112 A1 | 3/2012 | Kotera | |
| 2012/0097655 A1 | 4/2012 | Daniel | |
| 2012/0248080 A1 | 10/2012 | Hutchison | |
| 2012/0291172 A1 | 11/2012 | Wills | |
| 2012/0298642 A1 | 11/2012 | Lambert | |
| 2013/0112674 A1 | 5/2013 | Mnich | |
| 2013/0112676 A1 | 5/2013 | Hutchison | |
| 2013/0264323 A1 | 10/2013 | Daniel | |
| 2013/0270245 A1 | 10/2013 | Holverson | |
| 2014/0021183 A1 | 1/2014 | Peters | |

(56) References Cited

U.S. PATENT DOCUMENTS

| | | |
|---|---|---|
| 2014/0158669 A1 | 6/2014 | Davidson |
| 2014/0183176 A1 | 7/2014 | Hutchison |
| 2014/0217077 A1 | 8/2014 | Davidson |
| 2014/0251971 A1 | 9/2014 | Hearn |
| 2014/0263237 A1 | 9/2014 | Daniel |
| 2014/0263241 A1 | 9/2014 | Henry |
| 2014/0263243 A1 | 9/2014 | Marschke |
| 2014/0367370 A1 | 12/2014 | Hutchison |
| 2015/0001197 A1 | 1/2015 | Marschke |
| 2015/0083702 A1 | 3/2015 | Scott |
| 2015/0105898 A1 | 4/2015 | Adams |
| 2016/0074954 A1 | 3/2016 | Marschke |
| 2016/0144444 A1 | 5/2016 | Davidson |
| 2016/0167151 A1 | 6/2016 | Mehn |
| 2016/0288235 A1 | 10/2016 | Davidson |
| 2016/0318112 A1 | 11/2016 | Hutchison |

FOREIGN PATENT DOCUMENTS

| | | |
|---|---|---|
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 101804495 | 8/2010 |
| CN | 101862886 | 10/2010 |
| CN | 102470473 | 5/2012 |
| CN | 102554418 | 7/2012 |
| CN | 102596475 | 7/2012 |
| CN | 102770228 | 11/2012 |
| CN | 202824943 | 3/2013 |
| DE | 2501928 | 7/1976 |
| DE | 19808383 | 9/1999 |
| EP | 0194045 | 9/1986 |
| EP | 0387223 | 9/1990 |
| EP | 1036627 A2 | 9/2000 |
| EP | 1232825 | 8/2002 |
| EP | 2218537 | 8/2010 |
| EP | 2286949 | 2/2011 |
| FR | 1443701 | 6/1966 |
| JP | S5719166 | 2/1982 |
| JP | S57109573 | 7/1982 |
| JP | S60108175 | 6/1985 |
| JP | S60108176 | 6/1985 |
| JP | S6471575 | 3/1989 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003311409 | 11/2003 |
| JP | 2005034853 | 2/2005 |
| JP | 2006205153 | 8/2006 |
| JP | 2009072814 | 4/2009 |
| JP | 4950819 | 6/2012 |
| KR | 1020120027764 | 3/2012 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |

OTHER PUBLICATIONS

International Search Report from PCT application No. PCT/US2013/073863 dated May 2, 2014, 15 pgs.

European Communication Appln No. 14780932.1 dated Aug. 2, 2018 (3 pgs).

"ALT 304," Miller—The Power of Blue, Jun. 2001.

"Maxstar 200 SD, DX, and LX," Miller Electric Mfg. Co., Oct. 2003.

Bondy et al., "Graph Theory with Applications," Department of Combinatorics and Optimization, University of Waterloo, 1976, p. 7-8.

\* cited by examiner

SYSTEM FOR ARC WELDING WITH ENHANCED METAL DEPOSITION

BACKGROUND

The invention relates generally to welding systems and, more particularly, to an arc welding power supply used for enhanced metal deposition.

Welding is a process that has become increasingly ubiquitous in various industries and applications. While such processes may be automated in certain contexts, a large number of applications continue to exist for manual welding operations. Such welding operations generally involve an electrode configured to pass an arc between a torch and a workpiece, thereby heating the workpiece to create a weld. In many systems, a consumable filler material is provided to the weld, where it becomes molten and is deposited into the weld. In some welding systems, the filler material is heated before it is brought to the weld, allowing for a quicker and smoother transition into a molten state for metal deposition.

Such welding systems generally include two power sources. One power source provides a current for resistively heating the consumable filler material. The other power source provides power for heating the workpiece to establish and maintain the weld pool. This second power source may include a gas metal arc welding (GMAW) power supply, a gas tungsten arc welding (GTAW) power supply, a laser, or other heat source. Unfortunately, it can be expensive to implement equipment for heating both the workpiece and the consumable material. In addition to the high cost, it can be difficult to integrate multiple power sources with existing hand-held or automated welding systems.

BRIEF DESCRIPTION

In an embodiment, a welding system includes a power supply configured to output power to a welding device. The power supply is configured to alternate the power output between an arc phase and a hotwire phase. The power output in the arc phase produces an arc between a welding electrode and a workpiece. The power output in the hotwire phase heats the welding electrode without producing an arc.

In another embodiment, a welding power supply includes control circuitry configured to cycle welding power output from the power supply to a welding electrode between an arc phase and a hotwire phase. The control circuitry conditions the welding power to produce an arc between the welding electrode and a workpiece in the arc phase. The control circuitry conditions the welding power to heat the welding electrode without producing an arc in the hotwire phase.

In a further embodiment, a welding system includes a welding torch configured to direct a welding electrode toward a workpiece. The welding system also includes a power supply configured to provide power to the welding torch in an arc phase and in a hotwire phase, alternating between the arc phase and the hotwire phase. A current heats the welding electrode without producing an arc between the welding electrode and the workpiece in the hotwire phase.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Presently disclosed embodiments are directed to welding systems for alternating between an arc phase of welding power output and a hotwire phase of power output. In the arc phase, the process power may be relatively high and provided to the welding torch for establishing and maintaining an arc, thereby heating the workpiece and electrode. In the hotwire phase, the process power may be relatively low for resistively heating the welding wire without producing an arc. In this way, a single power supply may be able to provide power and mass-flow management of the hotwire welding process to control heat input, dilution, etc. An embodiment may involve providing power to an induction heating element located around the welding wire to inductively heat the wire. Control circuitry in the power supply may provide signals for alternating the power output, welding wire feed speed, contact points, or other welding parameters, as the welding system cycles between the arc phase and the hotwire phase. The welding system may cycle between these phases of power output at a constant frequency. In some embodiments, the control circuitry may provide adjustments to current and/or wire feed speed to maintain the system in the hotwire phase for a predetermined duration.

Figure 1:
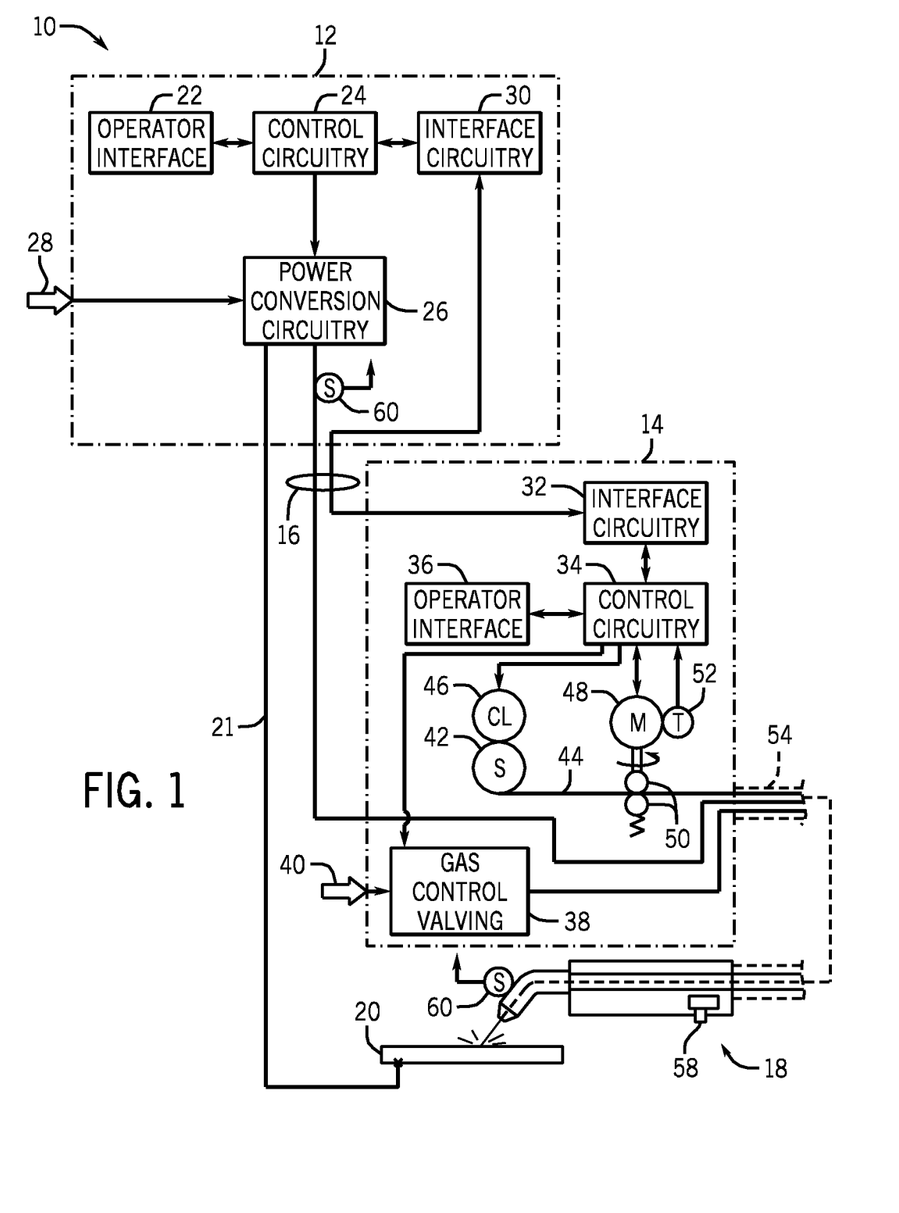
FIG. 1 is a diagrammatical representation of an embodiment of a welding system that may implement an arc/hotwire welding process.

Turning now to the figures, FIG. 1 is an embodiment of a welding system 10, which includes a power supply 12 and a wire feeder 14 coupled to one another via conductors or conduits 16. In the illustrated embodiment, the power supply 12 is separate from the wire feeder 14, such that the wire feeder 14 may be positioned at some distance from the power supply 12 near a welding location. However, it should be understood that the wire feeder 14, in some implementations, may be integral with the power supply 12. In such cases, the conduits 16 would be internal to the system. In embodiments in which the wire feeder 14 is separate from the power supply 12, terminals are typically provided on the power supply 12 and on the wire feeder 14 to allow the conductors or conduits 16 to be coupled to the devices so as to allow for power and gas to be provided to the wire feeder 14 from the power supply 12, and to allow data to be exchanged between the two devices, as described more fully below.

The system 10 is designed to provide wire, power, and shielding gas to a welding torch 18. The torch 18 may be of many different types, and generally allows for the feed of a welding wire and shielding gas to a location adjacent to a workpiece 20, where a weld is to be formed to join two or more pieces of metal. A second conductor 21 is run to the workpiece 20 to complete an electrical circuit between the power supply 12 and the workpiece 20.

The system 10 is designed to allow for data settings to be selected by the operator, particularly via an operator interface 22 provided on the power supply 12. The operator interface 22 will typically be incorporated into a front faceplate of the power supply 12, and may allow for selection of settings such as the type of weld process, the type of wire to be used, voltage and current settings, and so forth. These weld settings are communicated to control circuitry 24 within the power supply 12. In the illustrated embodiment, the system 10 is designed to allow for gas metal arc welding (GMAW). It should be noted that while reference is made in the present disclosure to "GMAW" processes, the torch 18 and techniques described herein may be used with or without inert gas, such as with flux cored or metal cored wires.

The control circuitry 24 operates to control generation of welding power output that is applied to the welding wire for carrying out the desired welding operation. In presently disclosed embodiments, the control circuitry 24 is configured to cycle the welding power output between an arc phase and a hotwire phase. The control circuitry 24 is coupled to power conversion circuitry 26. This power conversion circuitry 26 is adapted to create the output power that will ultimately be applied to the welding wire at the torch 18. Various power conversion circuits may be employed, including choppers, boost circuitry, buck circuitry, inverters, converters, and so forth. The power conversion circuitry 26 is coupled to a source of electrical power, as indicated by arrow 28. The power applied to the power conversion circuitry 26 may originate in the power grid, although other sources of power may also be used, such as power generated by an engine-driven generator, batteries, fuel cells or other alternative sources. Finally, the power supply 12 illustrated in FIG. 1 includes interface circuitry 30 configured to allow the control circuitry 24 to exchange signals with the wire feeder 14.

The wire feeder 14 includes complimentary interface circuitry 32 that is coupled to the interface circuitry 30. The wire feeder 14 also includes control circuitry 34 coupled to the interface circuitry 32. The control circuitry 34 allows for wire feed speeds to be controlled in accordance with operator selections. The control circuitry 34 is coupled to an operator interface 36 on the wire feeder 14 that allows selection of one or more welding parameters, particularly wire feed speed. The operator interface 36 also may allow for selection of such weld parameters as the type of welding process, the type of wire utilized, current, voltage or power settings, power cycle frequency, and so forth. The control circuitry 34 is coupled to gas control valving 38, which regulates the flow of shielding gas to the torch 18. In general, such gas is provided at the time of welding, and may be turned on immediately preceding welding and/or for a short time following welding. The gas supplied to the gas control valving 38 is typically provided in the form of pressurized bottles, as represented in FIG. 1 by arrow 40.

The wire feeder 14 includes components for feeding wire to the torch 18, and thereby to the welding application, under the control of the control circuitry 34. For example, one or more spools 42 of welding wire are housed in the wire feeder 14. Welding wire 44 is unspooled from the spools 42 and is progressively fed to the torch 18 as described below. Each of the spools 42 may be associated with a clutch 46 that disengages the spool 42 when the welding wire 44 is to be fed to the torch 18. The clutch 46 may be regulated to maintain a minimum friction level to avoid free spinning of the spools 42. A feed motor 48 is provided that engages with wire feeder feed rolls 50 to push the welding wire 44 from the wire feeder 14 towards the torch 18. In practice, one of the feed rolls 50 is mechanically coupled to the feed motor 48 and is rotated by the feed motor 48 to drive the welding wire 44 from the wire feeder 14, while the mating feed roll is biased towards the welding wire 44 to maintain good contact between the feed rolls 50 and the welding wire 44. Some systems may include multiple pairs of such feed rolls 50. In an embodiment, the feed motor 48 may be a torque-limited motor. Finally, in certain embodiments, a tachometer 52 is provided for detecting the speed of the feed motor 48, the feed rolls 50, or any other associated component in order to provide an indication of the actual wire feed speed. Signals from the tachometer 52 are fed back to the control circuitry 34.

It should be noted that other system arrangements and input schemes may be implemented. For example, the welding wire 44 may be fed from a bulk storage container (e.g., a drum) or from one or more spools outside of the wire feeder 14. Similarly, the welding wire 44 may be fed from a "spool gun" in which the spool 42 is mounted on or near the torch 18. As noted herein, the wire feed speed settings may be input via the operator interface 36 on the wire feeder 14, on the operator interface 22 of the power supply 12, or both. In systems having wire feed speed adjustments on the torch 18, this may be the input used for the setting.

Power from the power supply 12 is applied to the welding wire 44, typically by means of a weld cable 54. Similarly, shielding gas is fed through the wire feeder 14 and the weld cable 54. During welding operations, the welding wire 44 is advanced through the weld cable jacket towards the torch 18. The torch 18 may include a trigger switch 58 that provides a signal that is fed back to the wire feeder 14 and therefrom back to the power supply 12 to enable the welding process to be started and stopped by the operator. That is, upon depression of the trigger switch 58, gas flow is begun, wire is advanced, and power is applied to the weld cable 54 and through the torch 18 to the advancing welding wire 44.

In present embodiments, the power supply 12 is configured to alternate the power output between an arc phase and a hotwire phase. In each phase, the power is provided to the torch 18 for a specific purpose. For example, the power output in the arc phase is directed through the welding wire 44 to produce an arc between the welding wire 44 and the workpiece 20, as described above. In the hotwire phase, however, the power is output toward the torch 18 in order to heat the welding wire 44 without producing an arc. In the illustrated embodiment, this involves outputting a different amount of power to the welding wire 44, so that the current flowing through the welding wire 44 resistively heats the welding wire 44. When the welding wire 44 is maintained at a higher temperature, it becomes more easily molten and deposited into the weld. By cycling between the two phases, it may be possible to deposit more filler material into a weld while providing less heat to the workpiece 20 via the welding arc. In the disclosed embodiments, the power output from the power supply 12 is not limited to DC power, but may include AC or pulsed power in one or both of the alternating phases.

The control circuitry 24 may operate to control the power output from the power supply 12 in both the arc phase and the hotwire phase. For example, the control circuitry 24 may provide signals to the power conversion circuitry 26 for cycling the power output from the power supply 12 between the arc phase and the hotwire phase at a predetermined frequency. This frequency may be manually set via the operator interface 22 or automatically selected based on inputs related to the type of welding wire 44 used, the welding process, the material or thickness of the workpiece 20, and so forth. The control circuitry 24 may provide signals for managing the total process power, the heat output to the workpiece 20, and the mass flow rate of filler material entering the weld. Such control may be available during the arc phase, the hotwire phase, and the transition between these phases. In some embodiments, the control circuitry 24 may operate to maintain the welding power output in the hotwire phase for a desired amount of time, keeping the system 10 from prematurely breaking into an arc. The control circuitry 24 may execute such control based on feedback provided via sensors 60 located throughout the welding system 10. The sensors 60 may include voltage sensors, current sensors, light sensing devices (photodiodes, photovoltaics, photoresistors, etc.) strain gauges, wire feed speed sensors, torque sensors, etc. The change in power output may be accompanied by a change in welding wire feed speed. In such instances, the control circuitry 24 may communicate with the wire feeder 14 to adjust the wire feed speed as the power supply 12 transitions from one phase of power output to another.

Figure 2:
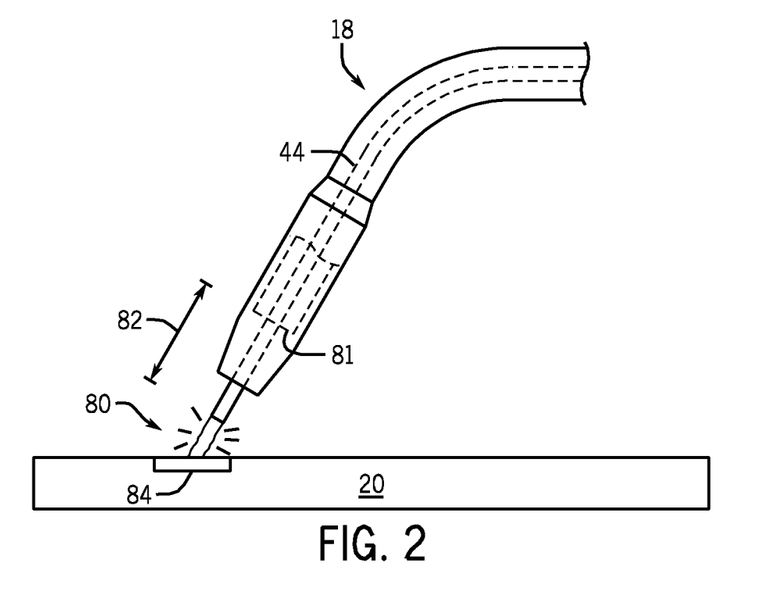
FIG. 2 is a side view of an embodiment of components of the welding system of FIG. 1 operating in an arc phase.
Figure 3:
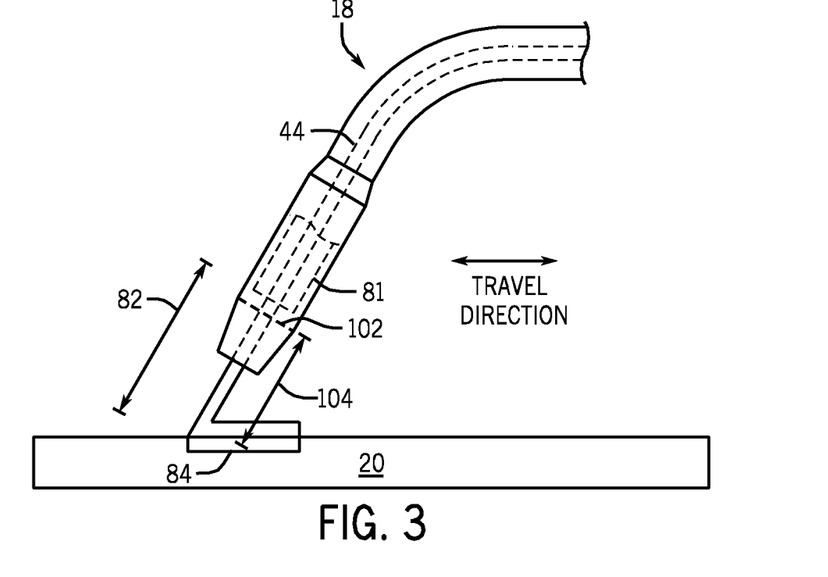
FIG. 3 is a side view of an embodiment of the components of FIG. 2 operating in a hotwire phase.

The power supply 12 alternates between outputting power in an arc phase and in a hotwire phase as the welding wire 44 is advanced through the torch 18. FIGS. 2 and 3 are side views of an embodiment of the torch 18 outputting the welding wire 44 toward the workpiece 20 during each of these phases. The illustrated embodiment shows the power for both heating the workpiece 20 and heating the filler material (e.g., welding wire 44) flowing through the same conductor (e.g., welding wire 44). This would not be possible with conventional systems that output power to heat the workpiece 20 (e.g., via a welding torch, laser, etc.) from a first heating source and output power to heat the filler material from another heating source.

In FIG. 2, power flows through the welding wire 44 in the arc phase to establish and maintain an arc 80 between the welding wire 44 and the workpiece 20. The torch 18 may include an electrically conductive contact tube 81 that receives and transfers the welding power from the power supply 12 to the welding wire 44 as the wire exits the torch 18. The output power may be relatively high to produce the arc 80, compared to the power output during the hotwire phase. The voltage drops across a contact point, electrode extension 82, anode (e.g., tip of the welding wire 44), arc column, and cathode to produce the arc 80. The welding wire 44 is advanced through the torch 18 and toward the workpiece 20 at a predetermined wire feed rate. This predetermined wire feed speed may be appropriate for maintaining a desired deposition rate of filler material from the welding wire 44 into a weld puddle 84, and for maintaining a desired length of the electrode extension 82. The electrode extension 82 is the length of the welding wire 44 through which the current flows from the contact tube 81 to the arc 80. The electrode extension 82 may change based on both advancement and deposition of the welding wire 44. The power output is sufficient to establish and increase a heat content of the weld puddle 84 formed on the workpiece 20.

In the hotwire phase, as illustrated in FIG. 3, there is no arc produced between the welding wire 44 and the workpiece 20. Instead, the power output to the welding wire 44 contributes to Joule heating within the welding wire 44. The power output of the power supply 12 may be relatively low in the hotwire phase, where the only significant voltage drop is occurring along the length of the electrode extension 82 such that all of the energy is used to heat the electrode extension 82. As a result, the end of the welding wire 44 flows directly into the weld puddle 84. The power output from the power supply 12 may include a relatively high current to heat the welding wire 44 in the hotwire phase. The welding wire 44 may be delivered to the weld puddle 84 at the same or a different wire feed speed than is used in the arc phase. That is, in certain embodiments, the wire feeder 14 is configured to advance the welding wire 44 toward the workpiece 20 at a first feed rate during the arc phase and at a second feed rate during the hotwire phase, as controlled by the control circuitry 24 and 34. Any change in wire feed speed may be to account for a changed rate of metal deposition due to resistive heating. In an embodiment, the power supply 12 may provide signals to the wire feeder 14 to adjust the wire feed speed to maintain the power output in the hotwire phase. In addition, the power output from the power supply 12 to the welding wire 44 may be adjusted to maintain the welding system 10 in the hotwire phase for a pre-determined amount of time. That is, the control circuitry 24 may operate to adjust the output power in order to keep the welding wire 44 from breaking into the arc 80 before an appointed time for the welding system 10 to enter the arc phase.

In some embodiments, the welding system 10 may use the same point of electrical contact (e.g., contact tube 81) in the torch 18 as the power output phase changes. In other embodiments, the welding system 10 may change the point of electrical contact as the power output phase changes. In addition, the control circuitry 24 may provide control signals for adjusting the electrode contact point to maintain the power output in the hotwire phase. Adjusting the contact point may be accomplished in many different ways. For example, the contact tube 81 may serve as the contact point during one of the phases (e.g., arc phase or hotwire phase) where the power is provided to the welding wire 44, and another contact point 102 may be used during the other phase. The contact point 102 is located closer to the outlet of the torch 18 so that the current flows through a shorter electrode extension 104 in one of the phases. This may decrease the Joule heating provided to the welding wire 44 in that phase, further altering filler material deposition. A change in the point of contact in the torch 18 may be accomplished in different ways. For example, in certain embodiments, the welding system 10 may include two power supplies 12, one to provide the arc phase power to the welding wire 44 via the contact tube 81 (or the contact point 102), and another to provide additional hotwire phase power to the welding wire 44 via the contact point 102 (or the contact tube 81). In other embodiments, the contact tube 81 may be mechanically actuated toward the position of the illustrated contact point 102 and back, based on the phase of power output. In still other embodiments, a switch in the control circuitry 24 may change states to switch the power provided from the power supply 12 between the contact tube 81 and the other contact point 102.

In embodiments utilizing an automated torch system, the electrode extension 104 may be adjusted to facilitate the transition between the arc and hotwire phases. In the case of the transition from the arc phase to the hotwire phase, the torch 18 could be retracted (effectively reducing the wire feed rate) at a rate that allows wire entering the weld puddle 84 to be heated to a temperature that causes the welding wire 44 to soften and lose some of its columnar strength. This softening of the welding wire 44 helps keep the electrode from pushing the welding torch 18 away from the workpiece 20 upon entering the hotwire phase. Conversely, during the transition from the hotwire phase to the arc phase, the welding torch 18 could be advanced toward the weld puddle 84, effectively increasing the wire feed rate and reducing the likelihood that the preheated welding wire 44 would be melted too quickly. Quick melting of the welding wire 44 at the onset of the arc phase may produce an excessively long arc length that is undesirable.

Figure 4:
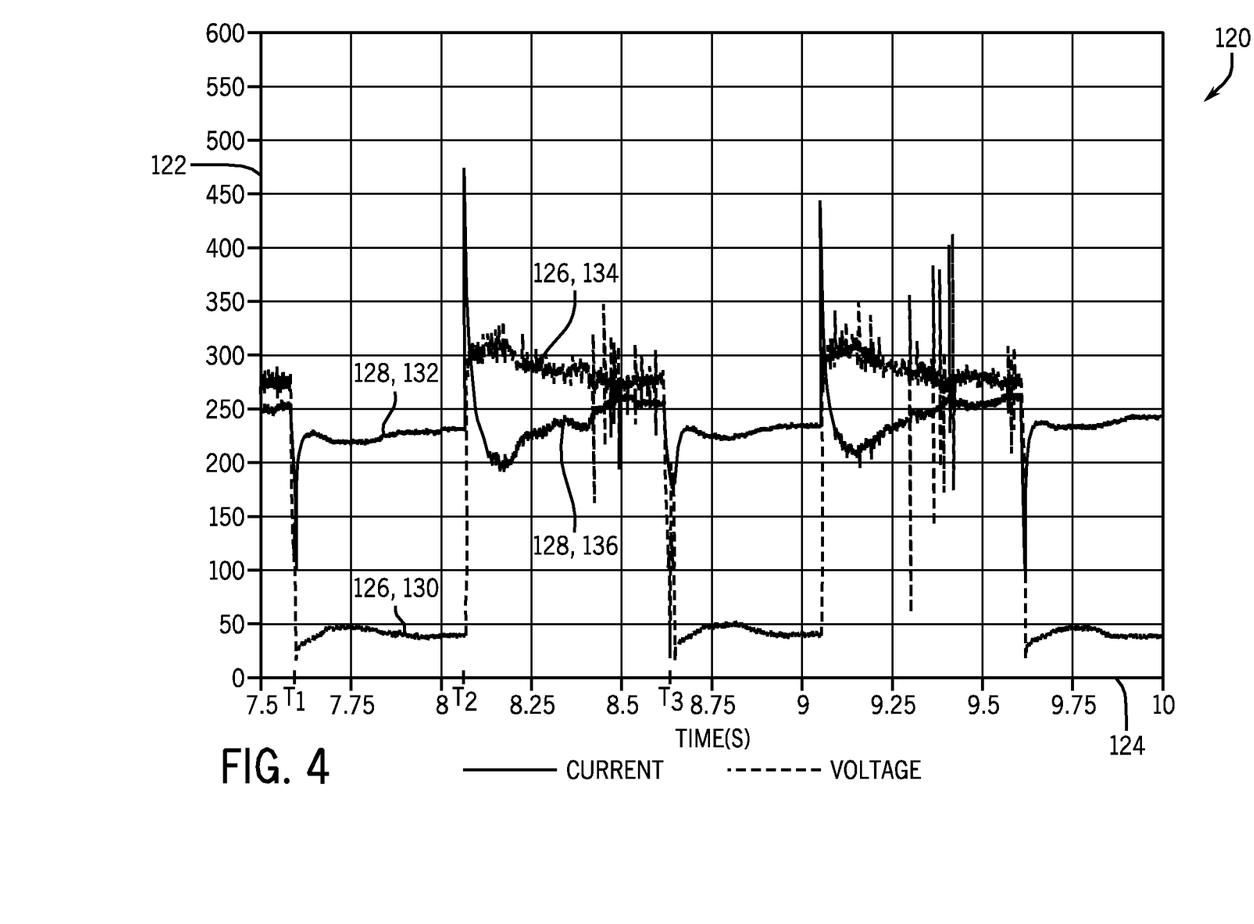
FIG. 4 is a plot illustrating an embodiment of current and voltage of power output from a welding power supply implementing an arc/hotwire welding process.

The power supply 12 may alternate between the arc phase and the hotwire phase at a pre-determined frequency. This pre-determined frequency may refer to a number of welding process cycles completed in a given amount of time. The welding process cycle may include a total of one arc phase and one hotwire phase. The power supply 12 may operate in the arc phase for a pre-determined portion of this complete cycle, and this is referred to as the duty cycle of the disclosed arc/hotwire welding process. These and other aspects relating to cycle frequency are depicted in FIG. 4, which is a plot 120 showing parameters 122 of the welding power output by a power supply 12 with respect to time 124. The parameters 122 include the voltage 126 and the current 128 of the power supplied to the torch 18 as the power supply 12 alternates between the arc phase and the hotwire phase. In some embodiments, the cycle frequency may be variable, depending on the type of welding process performed.

In the illustrated embodiment, the power output in the arc phase is noticeably different from the power output in the hotwire phase. The power output may be higher in the arc phase than the power output in the hotwire phase, as indicated by the current and voltage readings shown in the plot 120. Between times T1 and T2, the power output is in the hotwire phase, with a relatively low voltage 130 and a relatively high current 132. Between times T2 and T3, the power output is in the arc phase, with a relatively high voltage 134. The time period 124 from times T1 to T3 represents one complete cycle of the alternating power output, and the duty cycle may be determined by dividing the time period between times T2 and T3 by the time period between times T1 and T3. The alternating welding process may be highly dependent on cycle frequency. In the illustrated embodiment, the cycle frequency is approximately 1.0 Hz, as the process completes approximately one cycle every second. It may be desirable for the cycle frequency to range from approximately 1.0 to 1.5 Hz, 1.0 to 3.0 Hz, 1.0 to 5.0 Hz, or 1.0 to 10 Hz. Other embodiments could operate at higher cycle frequencies. If the cycle frequency is too high, the welding system 10 may tend toward short circuit transfer, where a significant mass of the welding wire 44 is not transferred to the base material (e.g., workpiece 20) in the hotwire phase. If the cycle frequency is too low, there may be too much power delivered in the arc phase and too little power delivered in the hotwire phase to produce a consistent weld bead throughout the welding process. If the duration of the arc phase is too long, heat input to workpiece 20 could be too high, leading to undesirable results. If the duration of the hotwire phase is too long, the weld puddle 84 may solidify and additional welding wire 44 deposited therein does not mix with the molten surface of the workpiece 20. These conditions could negatively affect quality and/or aesthetic appearance of the weld.

The alternating power output from the welding power supply 12 may reduce the heat input to the workpiece 20. In GMAW systems, the arc accounts for approximately 85% of the total heat energy provided from the power supply 12. The arc heat may be transferred to the workpiece 20 by conduction, convection, and radiation. There may also be an element of arc energy that is transferred to the workpiece 20 by droplet impingement. The remaining energy available from the power supply 12 generally goes into heating the electrode extension 82 of the welding wire 44 via Joule heating. Joule heating, or resistive heating, refers to the heat generated through resistive losses of a conductor. As such, the heat provided to the workpiece 20 in a constant voltage GMAW process may be defined by the following relationship:

$$H = \eta \frac{IV}{v}. \quad (1)$$

In equation 1, H represents the heat input to the workpiece 20, $\eta$ represents the efficiency of the welding process, I represents the average current of the power output, V represents the average voltage of the power output, and v represents the travel speed of the torch 18 moving with respect to the workpiece 20. As discussed above, however, the disclosed embodiments cycle the output power through a relatively high power arc phase and a relatively low power hotwire phase. Thus, the heat input to the workpiece 20 for this welding process may be defined by the following relationship:

$$H = \omega \eta_{arc}\left[\frac{IV_{arc}}{v_{arc}}\right] + (1-\omega)\eta_{hotwire}\left[\frac{IV_{hotwire}}{v_{hotwire}}\right]. \quad (2)$$

In equation 2, $\omega$ represents the duty cycle of the welding process, or the percentage of each cycle in which the power output is in the arc phase. The efficiencies of the process in each phase are represented by $\eta_{arc}$ and $\eta_{hotwire}$, the power outputs are represented by $IV_{arc}$ and $IV_{hotwire}$, and the travel speeds of the torch 18 are represented by $v_{arc}$ and $v_{hotwire}$. Because of the lower average voltage 130 in the hotwire phase, as shown in FIG. 4, the power output in the hotwire phase is inherently smaller than the power output in the arc phase. As a result, the total heat input to the workpiece 20 in the alternating welding process is lower than the total heat input in a constant voltage welding process.

As a result of the decreased heat input to the workpiece 20, the welding system 10 may be able to deposit more filler material into the weld without overheating the workpiece 20. By way of reduced "arc on time," the welding system 10 may be used to fill relatively large gaps in the workpiece 20. This may not be possible with conventional systems that constantly provide arc heat to the workpiece 20. Similarly, the reduced heat input to the workpiece 20 may be useful when the welding wire 44 is being deposited as an overlay onto the workpiece 20. In some embodiments, the overlay material (e.g., nickel tungsten carbide) may be particularly temperature sensitive, so it is desirable to keep "arc on time" as low as possible.

The alternating power output may facilitate increased traveling speeds of the torch 18, which may be useful for welding on thin sheets of material. During the arc phase, the relatively high power output to the workpiece 20 may create a relatively larger weld puddle 84 with higher heat content, offset by the duration of the hotwire phase as well as increased travel speed.

In an embodiment, the power output and/or the duty cycle may be adjusted to change an aesthetic appearance of the weld bead produced by the welding system 10. Such adjustments may be made based on operator inputs to the power supply 12.

In an embodiment, the power output and/or the duty cycle may be adjusted to tailor the cooling rate, and therefore the microstructural characteristics of the workpiece 20. The microstructure is dependent on the cooling rate of workpiece 20, which in turn is inversely proportional to the heat input to the workpiece 20. As mentioned above, the heat input to the workpiece 20 is influenced by the power and travel speed of each phase, as well as the duty cycle and frequency of the process.

Figure 5:
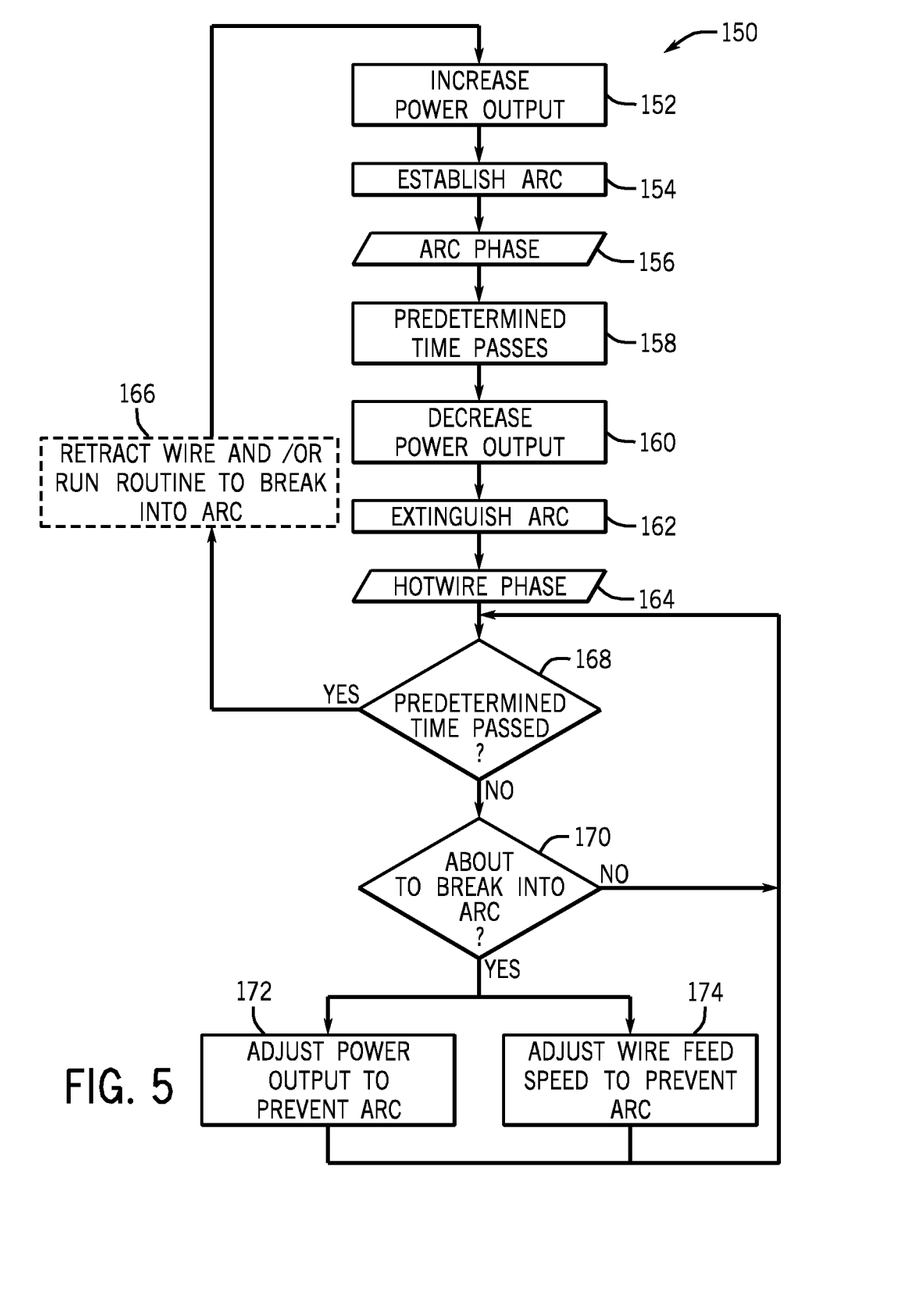
FIG. 5 is a process flow diagram of an embodiment of a method for implementing, via the welding system of FIG. 1, an arc/hotwire welding process.

FIG. 5 is a process flow diagram of a method 150 for implementing the disclosed arc/hotwire welding process. The method 150 includes increasing (block 152) the power output from the power supply 12 to establish (block 154) the arc 80. More specifically, the power supply 12 may provide the power to the welding wire 44 at a relatively high voltage 134. Upon arc ignition, the power supply 12 operates in the arc phase (block 156), outputting power at the relatively high voltage 134 and maintaining the arc 80 to heat the workpiece 20. After a predetermined time passes (block 158), the power supply 12 may decrease the power output (block 160) to the welding wire 44. The predetermined time may correspond with the duty cycle, representing a certain proportion of the arc/hotwire cycle frequency, as discussed above. The decrease in power output may extinguish (block 162) the arc 80 so that the power supply 12 outputs power in the hotwire phase (block 164).

In general, the method 150 involves cycling the power supply 12 output between the arc phase (block 156) and the hotwire phase (block 164) at a desired frequency. To automatically provide this alternating power, the control circuitry 24 may monitor the time via a counter and provide signals to the power conversion circuitry 26 for outputting power in the correct phase at a given time. The control circuitry 24 may provide additional control and tailoring of the power output and other welding parameters for a smooth transition from the hotwire phase (block 164) back to the arc phase (block 156). For example, the method 150 may include retracting (block 166) the welding wire 44 prior to or in conjunction with increasing (block 152) the power output to transition into the arc phase (block 156). The control circuitry 24 may signal the wire feeder 14 to adjust rotation of the feed rolls 50 to pull the welding wire 44 away from the workpiece 20. Retracting the welding wire 44 in this way may reduce the spatter produced during arc re-ignition. In some embodiments, this transition from hotwire to arc phase may involve running a routine (block 166) to break back into an arc. This routine, which may include a reduction in welding current, may be run in addition to or in lieu of a wire retraction. Such a reduction in weld current may enable a smoother transition of the power output, resulting in less spatter.

The method 150 may include determining (block 168) whether the predetermined time for the hotwire phase has passed based on a timer or counter in the power supply 12. The predetermined time may be chosen based on an amount of time that the weld puddle can cool before the arc 80 should be relit to input additional heat into the workpiece 20. If the time has passed, the control circuitry 24 may switch the power supply 12 to outputting power in the arc phase, as described above. However, if the predetermined time has not yet passed, the power supply 12 may determine (block 170) whether the welding power output to the welding wire 44 is about to break into an arc. If the arc 80 is about to be established, but the predetermined hotwire time period has not passed, the welding system 10 may adjust the power output (block 172) or the wire feed speed (block 174) to prevent the arc, keeping the welding power output in the hotwire phase.

The power supply 12 may be configured to operate in a regulated metal deposition mode to control when the arc 80 is established. Specifically, the control circuitry 24 may predict when the system 10 will likely transition from the hotwire phase to the arc phase, and adjust (block 172) the power output to maintain welding operation in the hotwire phase until the desired time. This may involve a reduction or disruption of the weld current flowing through the welding wire 44, which may keep an arc from breaking across the space between the welding wire 44 and the workpiece 20.

The determinations (blocks 168 and 170) of whether the hotwire phase has reached an appropriate timeout and whether arc re-ignition is about to occur may be made based on sensor feedback from one or more of the sensors 60. The sensors 60 may provide feedback indicative of one or more welding parameters for processing via the control circuitry 24, and the control circuitry 24 may output appropriate signals to the power conversion circuitry 26 and/or the wire feeder 14. The sensors 60 may include, for example, a voltage sensor and/or current sensor for monitoring the voltage drop across components of the welding system 10, current, or power output from the power supply 12. In addition, a force sensor located in the torch 18 may provide force feedback indicative of when the arc is about to ignite. In some embodiments, there may be a light sensor (e.g., red or infrared sensitive photo-diode) mounted to the torch 18 for monitoring the light emitted from the weld puddle 84. This light intensity may be proportional to the heat of the weld puddle 84, and the power supply 12 may be configured to increase the power output to enter arc phase power when the light intensity reaches a certain level indicative of needing additional heat input. Thus, the light sensor may be utilized to provide a rough determination (block 168) of whether the predetermined time for the hotwire phase has passed.

Figure 6:
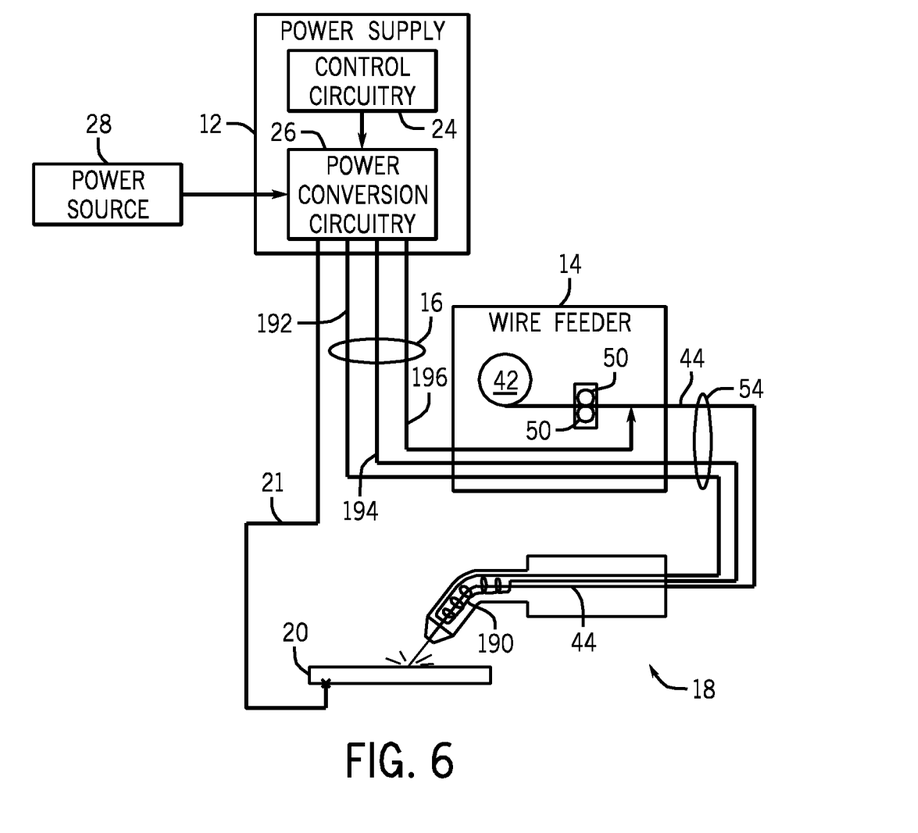
FIG. 6 is a diagrammatical representation of an embodiment of a welding system that may implement an arc/hotwire welding process.

FIG. 6 is an embodiment of the welding system 10 that provides additional heat to the welding wire 44 during the hotwire welding phase via an induction coil 190 in the torch 18. The illustrated power supply 12 may provide a current flow through the induction coil 190 via conductors 192 and 194. Due to the magnetic flux in the induction coil 190, a current is induced in the welding wire 44, adding heat to the welding wire 44. The power conversion circuitry 26 provides power through a separate conductor 196 that applies the power to the welding wire 44 for heating the welding wire 44, and for establishing and maintaining the arc 80 during the arc phase. That is, the power output to the welding wire 44 may flow to the torch 18 via a different route than the power output to the induction coil 190. The alternating process power flows through the welding wire 44 during both the arc phase and hotwire phase. The power supply 12 may provide current to the induction coil 190 for additional heating of the welding wire 44 during the hotwire phase.

In some embodiments, current may flow through the induction coil 190 during both the arc phase and hotwire phase. That is, any combination of power output to one or both of the welding wire 44 and the induction coil 190 may provide the appropriate transition between arc phase and hotwire phase system operation. In some embodiments, the welding system 10 may include a second power supply for providing current to the induction coil 190 during the hotwire phase. The second power supply would communicate with the power supply 12 via control circuitry in order to coordinate the switching between arc phase and hotwire phase power output. Regardless of whether one or more power supplies 12 are used to output the power in the arc phase and the hotwire phase, the disclosed welding system 10 is configured to alternate between the arc phase welding power output for heating the workpiece 20 and the hotwire phase power output for heating the welding wire 44 without increasing the heat input to the workpiece 20 relative to a 100% arc phase process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a single power supply comprising control circuitry and power conversion circuitry, wherein the control circuitry is configured to control output power of the power conversion circuitry to a single input of a welding device, wherein the single power supply is configured to alternate the power output during a welding operation in repeated cycles between a first power output amount in an arc phase and a second power output amount in a hotwire phase of each cycle at a cycle frequency within a range of 1.0 to 10 Hertz, and wherein the single power supply completes an electric welding circuit by coupling only between a welding electrode and a workpiece;
wherein the control circuitry is configured to control the power conversion circuitry to provide the first power output amount in each arc phase to produce an arc between the welding electrode and the workpiece; and
wherein the control circuitry is configured to control the power conversion circuitry to provide the second power output amount in each hotwire phase to heat the welding electrode without producing an arc, and wherein the second power output amount is lower than the first power output amount.

2. The welding system of claim 1, wherein the single power supply is configured to output the power at a cycle frequency of each respective cycle.

3. The welding system of claim 2, wherein the single power supply is configured to operate at a constant duty cycle of each arc phase relative to the cycle frequency.

4. The welding system of claim 1, comprising a welding wire feeder, wherein the control circuitry controls the welding wire feeder to advance the welding electrode toward the workpiece at a first feed rate during each arc phase and at a second feed rate during each hotwire phase of each respective cycle.

5. The welding system of claim 1, wherein the single power supply is configured to provide signals to a welding wire feeder to adjust a wire feed speed to maintain the the second power output amount in each hotwire phase.

6. The welding system of claim 1, wherein the welding device is configured to move the welding electrode away from the workpiece during a transition from each hotwire phase to each arc phase.

7. The welding system of claim 1, wherein the single power supply is configured to output the power to the welding electrode in both each arc phase and each hotwire phase.

8. The welding system of claim 1, wherein the single power supply is configured to adjust a current to maintain the second power output amount in each hotwire phase.

9. The welding system of claim 1, wherein the single power supply is configured to output the second power output amount to the welding electrode via a first contact point of the welding device during each arc phase and to output the second power output amount to the welding electrode via a second contact point of the welding device during each hotwire phase.

10. A welding system, comprising:
a welding torch configured to direct a welding electrode toward a workpiece; and
a single power supply comprising control circuitry and power conversion circuitry, wherein the control circuitry is configured to control operation of the power conversion circuitry to provide power to a single input of the welding torch in repeated cycles between an arc phase and a hotwire phase, wherein the control circuitry is configured to alternate a power output between a first power output amount in the arc phase and a second power output amount in the hotwire phase during a welding operation in each cycle, wherein the single power supply completes an electric welding circuit by coupling only between the welding electrode and the workpiece; and
a welding wire feeder comprising a feed motor configured to advance the welding electrode toward the workpiece at a first feed rate during each arc phase and at a second feed rate during each hotwire phase of each respective cycle in response to a control signal from the control circuitry,
wherein the control circuitry is configured to control operation of the power conversion circuitry to provide a current that heats the welding electrode without producing an arc between the welding electrode and the workpiece in each hotwire phase of each respective cycle.

11. The welding system of claim 10, wherein a separate current flows through an inductive heating element of the welding torch to provide additional heat to the welding electrode in each arc phase, each hotwire phase, or both.

12. The welding system of claim 10, wherein the single power supply is configured to provide the first power output amount to the welding electrode via a first contact point of the welding torch during each arc phase and to provide the second power output amount to the welding electrode via a second contact point of the welding torch during each hotwire phase.

13. The welding system of claim 10, wherein the single power supply is configured to adjust a welding parameter based on sensor feedback to maintain the second power output amount in each hotwire phase for a predetermined amount of time.

14. The welding system of claim 10, wherein the single power supply is configured to alternate between providing power in each arc phase and in each hotwire phase at a predetermined frequency.

15. The welding system of claim 10, wherein the control circuitry is configured to alternate between the arc phase and the hotwire phase in each cycle at a cycle frequency within a range of 1.0 to 10 Hertz.

16. The welding power supply of claim 1, wherein application of the arc phase and application of the hotwire phase do not overlap.

* * * * *